United States Patent [19]

Geri et al.

[11] Patent Number: 4,831,083

[45] Date of Patent: May 16, 1989

[54] CO-VULCANIZABLE COMPOSITIONS OF FLUOROELASTOMERS HAVING IMPROVED CHEMICAL STABILITY

[75] Inventors: Sergio Geri; Fabio Costanzi, both of Milan; Cirillo: Gianna, Genova; Giovanni Moggi, Milan, all of Italy

[73] Assignee: Ausimont S.r.l., Milan, Italy

[21] Appl. No.: 49,797

[22] Filed: May 15, 1987

[30] Foreign Application Priority Data

Jun. 19, 1985 [IT] Italy .................. 21213 A/85

[51] Int. Cl.$^4$ ............................................ C08L 27/12
[52] U.S. Cl. ................................. 525/199; 525/193; 525/194
[58] Field of Search .................. 525/194, 199, 193

[56] References Cited

U.S. PATENT DOCUMENTS

| | | | |
|---|---|---|---|
| 4,028,431 | 6/1977 | Futami et al. | 525/199 X |
| 4,200,568 | 4/1980 | Trautvetter et al. | 525/199 X |
| 4,251,399 | 2/1981 | Tomoda et al. | 525/199 X |
| 4,530,970 | 7/1985 | Morozumi et al. | 525/199 |
| 4,530,971 | 7/1985 | Geri et al. | 525/199 |

*Primary Examiner*—Theodore E. Pertilla
*Attorney, Agent, or Firm*—Stevens, Davis, Miller & Mosher

[57] ABSTRACT

Co-vulcanizable compositions comprising (A) 55-85% by weight of a fluoroelastomeric copolymer of vinylidene fluoride with perfluoropropene and possibly tetrafluoroethylene; (B) 45-15% by weight of a copolymer of tetrafluoroethylene and propylene; (C) 0.7-2.5 parts, per 100 parts of the (A)+(B) blend, of a bisphenolic compound; (D) 0.3-1.5 parts, per 100 parts of the (A)+(B) blend, of a quaternary ammonium, phosphonium or aminophosphonium organic compound; (E) 0.4-5 parts, per 100 parts of the (A)+(B) blend, of an organic peroxide; (F) 1-5% by weight, as referred to (A)+(B), of a peroxidic cross-linking coagent.

12 Claims, No Drawings

CO-VULCANIZABLE COMPOSITIONS OF FLUOROELASTOMERS HAVING IMPROVED CHEMICAL STABILITY

BACKGROUND OF THE INVENTION

1. Field of the Invention

This is a continuation-in-part of application Ser. No. 875,443, filed June 17, 1986, now abandoned.

The present invention relates to co-vulcanizable compositions of fluoroelastomers.

More particularly, the present invention relates to co-vulcanizable compositions of fluoroelastomers having improved chemical stability.

2. Description of the Prior Art

Fluoroelastomers on the basis of vinylidene fluoride, vulcanized according to the bisphenolic or dihydroxy systems (Kirk-Othmer, Encyclopaedia of Chemical Technology, Vol. 8, page 506, 1979), are very valuable products which are used in the industrial world, in particular in the fiels of the automotive and oil industries, and in general in the industrial energy field.

In the automobile field, fluoroelastomers are used mainly in the fuel circulation system or as components of engine parts and of parts of gearbox-differential-transmission units. In the first case, as application examples, membranes for fuel pumps, valve seats, non-return valves flexjible hoses and, in general, sealing gaskets for fuel can be mentioned. In the second case, analogous examples are gaskets for gear wheels, sealing liners for cylinders in diesel engines, gaskets for the crankshaft, non-return valves for the exhaust gases, gaskets of the type of shaft seals, and still others.

In the oil and industrial energy field, fluoroelastomers are used for applications wherein they come into direct contact with crude oil; and above all at high temperatures and pressures, such as, for example, for gaskets, valves and pumps, or parts thereof. In this field, an important application for fluoroelastomers is represented by the expansion joints used in the exhaust ducts for flue gases in thermoelectric power plants, wherein resistance to high temperatures combined with resistance to the corrosive action of acidic flue gases is required.

Fluoroelastomers are used in these, and in other fields, such as in the electric and electronic fields, thanks to their properties of high thermal stability and chemical resistance, even at high temperatures.

But during recent years, and in some application types, precise technological requirements have arisen which the manufactures of the prior art, vulcanized by the bisphenolic or dihydroxy systems, are not able to fullfil.

The problem involves in particular the chemical stability under severe operating conditions characterized by high temperatures in the presence of steam, of mineral acids, of highly aggressive lubricating fluids, such as, e.g., the oils of the SF series, containing as additives compounds having a high swelling capacity for fluoroelastomers based on vinylidene fluoride.

Furthermore, a general improvement is required as regards the processability characteristics of the mixes, for the molding of such articles as shaft seals, as well as the possibility to easily extrude the mixes to produce suitable semifinished articles which may even have complex profiles.

The problem of the chemical stability has been solved thanks to the use of the peroxidic vulcanization process.

However, this type of vulcanization does not fulfill the above-mentioned requirements as regards processability, in particular by molding and extrusion; furthermore, the same processability turns out to be less reliable (Rubber Chemistry and Techology, Vol. 55, page 906, 1982), and on the compression set test much poorer results are obtained (Kirk-Othmer, ibid., page 510).

In European patent application No. 84.110707, covulcanized compositions have been prepared and disclosed which have allowed certain improvements in performance to be achieved, but which still show poor processing reliability, as well as a slight decrease in chemical-thermal properties.

THE PRESENT INVENTION

The object of the present invention is to provide a covulcanizable composition of fluoroelastomers which overcomes the above-described drawbacks.

More particularly, an object of the present invention is to provide a co-vulcanizable composition of fluoroelastomers based on vinylidene fluoride which provides an improved processing reliability and better chemical and thermal stability.

In accordance with the present invention, it has now, surprisingly, been found that these and further objects are achieved by means of a co-vulcanizable elastomeric composition comprising:

(A) 55-85% by weight of a fluoroelastomer composed of 40-85 mol % of vinylidene fluoride, 15-35 mol % of perfluoropropene, and 0-30 mol % of tetrafluoroethylene;

(B) 15-45% by weight of a copolymer composed of 40-60 mol % of tetrafluoroethylene, and 60-40 mol % of propylene;

(C) 0.7-2.5 parts, per 100 parts of the (A)+(B) blend, of a dihydroxy organic compound;

(D) 0.3-1.5 parts, per 100 parts of the (A)+(B) blend, of a quaternary ammonium, phosphonium or aminophosphonium compound;

(E) 0.4-5 parts, per 100 parts of the (A)+(B) blend, of an organic peroxide;

(F) 1-5% by weight, referred to 100 pats of the (A)+(B) blend, of a peroxidic cross-linking coagent.

The elastomers of item (A) are known from the technical literature and can be prepared as described in Kirk-Othmer, ibid., pages 500-foll., or they can be found on the market under the tradenames VITON, TECHNOFLON, FLUOREL, DAIEL.

The copolymers of item (B) are also known from the technical literature and can be prepared as described in Rubber Chemistry and Technology, Vol. 50, pages 403, 1977, or they can be found on the market under the tradename AFLAS.

The dihydroxy organic compounds of item (C) are compounds known in the cross-linking of elastomers based on vinylidene fluoride, and can be selected from di-, tri-, and tetrahydroxy-benzene, di-, tri- and tetrahydroxy-naphthalene, di-, tri- and tetrahydroxy-anthracene, and bisphenols of the formula

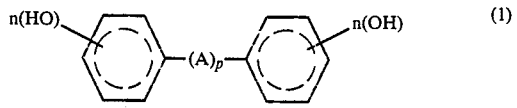

(1)

wherein A is a difunctional aliphatic, cycloaliphatic or aromatic radical having a number of carbon atoms within the range of from 1 to 13, or a thio, oxy, carbonyl, sulphinyl or sulphonyl radical, and wherein A may be optionally substituted with at least one chlorine or fluorine atom; p can be either 0 or 1; n may be either 1 or 2. Any aromatic ring of polyhydroxy compound may be optionally substituted with at least a chlorine, fluorine, bromine atom, with a —CHO group, or with a carboxylic or carbonyl radical of the formula —COR, with R being equal to —OH or to an alkyl, aryl or cycloalkyl radical with a number of carbon atoms within the range of from 1 to 8.

In formula (1), the —OH groups may be bound in any position on both rings.

Examples of products of formula (1) are described in U.S. Pat. No. 3,876,654.

Preferred products for the elastomeric composition of the present invention may be hydroquinone and bisphenol AF (hexafluoroisopropylidene-bis(4-hydroxyphenol)).

The compounds of item (D) are known as accelerator agents in the cross-linking of elastomers based on vinylidene fluoride, and may be:

$D^1$: quaternary ammonium compounds selected from those having the formula $$[NR_1R_2R_3R_4]_q{}^+ X^{(-)}{}_q \quad (2)$$

$$\left[ \begin{array}{c} \text{pyridinium ring} \\ N-R_5 \end{array} \right]_q^+ X^{(-)}{}_q \quad (3)$$

$$\left[ \begin{array}{c} \text{isoquinolinium ring} \\ N-R_5 \end{array} \right]_q^+ X^{(-)}{}_q \quad (4)$$

wherein $R_1$, $R_2$, $R_3$ and $R_4$, equal to or different from each other, may be an alkyl, fluoroalkyl, aralkyl, polyoxyalkenyl or polyoxyfluoroalkenyl group with a number of carbon atoms within the range of from 1 to 20, with the proviso that at least two of $R_1$, $R_2$, $R_3$ and $R_4$, are an alkyl or aralkyl group; $R_5$ may be an alkyl group with a number of carbon atoms within the range of from 1 to 20, X may be a hydroxide, a halide, a sulphate, a sulphite, a carbonate, a pentachlorothiophenolate, a tetrafluoroborate, a hexafluorosilicate, a hexafluorophosphate, a dimethyl phosphate, or a carboxylate or dicarboxylate of an alkyl or aralkyl or aryl group having from 1 to 20 carbon atoms; q is either 1 or 2 and represents the valence of X.

D2: quaternary phosphonium compounds of the formula $$[PR_6R_7R_8R_9]_r{}^+ Z^{(-)(r)} \quad (5)$$

wherein P can be, besides phosphorus, also arsenic or antimony, and wherein $R_6$, $R_7$, $R_8$ and $R_9$ may be selected from an alkyl, aryl, aralkyl, alkenyl group, with a number of carbon atoms within the range of from 1 to 20, and possibly substituted with chlorine, fluorine, bromine, cyano, —$OR_{10}$ and —$COOR_{10}$ or similar substituents, wherein $R_{10}$ may be an alkyl, aryl, arylalkyl or alkenyl group with a number of carbon atoms within the range of from 1 to 20; Z may be a halide, a sulphate, a sulphite, a carbonate, a pentachlorothiophenolate, a tetrafluoroborate, a hexafluorosilicate, a hexafluorophosphate, a dimethyl phosphate, or a carboxylate or a dicarboxylate of an alkyl or aralkyl group or of an alkenyl group having a number of carbon atoms within the range of from 1 to 20; r is either 1 or 2 and represents the valence of Z.

D3: compounds of aminophosphonium of the formula $$[P(NR'R'')_sR'''_{4-s}]^+ Y^{m-} \quad (6)$$

wherein R', R" and R''', equal to or different from each other, may be alkyl, cycloalkyl, aryl, aralkyl, oxyalkyl or polyoxyalkyl radicals with a free or etherified end hydroxy group, containing from 1 to 18 carbon atoms and optionally containing, as substituents, halogens, cyanides, hydroxy groups or carbalkoxy groups, and wherein R' and R" may be linked to each other by a nitrogen atom to form a heterocyclic ring;

s is an integer between 1 and 4, m is an integer from 1 to 3 equal to the valence of ion Y, and Y is either an organic or inorganic anion hving valence m.

The products having the formulae from (2) to (4) are described in greater detail in U.K. Pat. No. 1,356,344; compounds (5) are described in U.S. Pat. No. 3,876,654; and compounds of formula (6) in U.K. Pat. No. 2,010,285.

The organic peroxides of item (E) are those usually employed for the peroxidic cross-linking of elastomers; they are described together with the peroxidic cross-linking coagents (F), such as triallylisocyanurate (TAIC), in Rubber Chemistry and Technology, Vol. 51, page 940, 1978. Other peroxidic cross-linking coagents are, e.g., triallylcyanurate, tetramethyl-tetravinyl-cyclotetrasiloxane, tetrallylterephthalamide, trivinyl isocyanurate and tri(2-methylallyl)isocyanurate, the formula of said last compound being:

$$CH_3-\underset{CH_2}{\overset{\|}{C}}-CH_2-\underset{\underset{CO}{|}}{N}\underset{\underset{N}{|}}{\overset{CO}{\diagdown}}\underset{\underset{CH_2-\underset{CH_2}{\overset{\|}{C}}-CH_3}{|}}{\overset{CO}{\diagup}}N-CH_2-\underset{CH_2}{\overset{\|}{C}}-CH_3$$

The preferred peroxidic cross-linking coagents are triallylisocyanurate, triallylcyanurate and tetramethyl-tetravinyl-cyclotetrasiloxane.

Examples of organic peroxides which may be used in the compositions of the present invention comprise 2,5-dimethyl-2,5-di-tert.-butylperoxyhexane and the corresponding derivative of hexine.

The operating conditions for the preparation of the mixes and vulcanization are within those normally used for fluoroelastomers, and described in Kirk-Othmer, ibidem, pages 500-foll.

The co-vulcanizable compositions of the present invention have optimum characteristics for extrusion, optimum stability and optimum strength with respect to steam and to mixtures of water and ethylene glycol at high temperature.

For a still better understanding of the present invention, and of describing practical embodiments thereof, some illustrative but not limitative examples are as follows:

EXAMPLES 1-4

By blending in a cylinder mixer, elastomeric compositions were prepared, by starting from the following products:

Tecnoflon NM ®: a product of Montefluos, and constituted of a vinylidene fluoride (79% by mol) and perfluoropropene (21% by mol) copolymer;

AFLAS ® 150, a product of Asahi Glass, a copolymer containing equimolecular amounts of tetrafluoroethylene and propylene;

Bisphenol AF: hexafluoroisopropylidene-bis(4-hydroxyphenol);

BDDPCl: benzylidiphenyldiethylaminophosphonium chloride;

Luperco ® XL 101 = 2,5-dimethyl-2,5-di-tert-butyl-peroxyhexane.

TAIC = triallylisocyanurate.

to which the conventional additives for these types of mixes, such as, e.g. magnesium or lead oxides, calcium hydroxide, carbon black, carnauba wax, are added.

In Table 1 the data relating to three compositions according to the present invention (Tests 2, 3 and 4) and, for comparative purposes, the data relating to a vulcanizable composition of the prior art (Test 1) are reported:

TABLE 1

| Test | 1 | 2 | 3 | 4 |
|---|---|---|---|---|
| TECNOFLON NM pbw* | 100 | 80 | 70 | 60 |
| AFLAS 150 P pbw* | — | 20 | 30 | 40 |
| BISPHENOL AF pbw* | 1.8 | 1.3 | 1.15 | 1.0 |
| BDDPCl pbw* | 0.45 | 0.55 | 0.50 | 0.35 |
| Magnesium oxide pbw* | 5 | 5 | 5 | 5 |
| Calcium hydroxide pbw* | 6 | 3.5 | 3 | 2.5 |
| LUPERCO XL 101 pbw* | — | 1.1 | 1.5 | 2 |
| TAIC pbw* | — | 1.1 | 1.5 | 2 |
| Carnauba Wax pbw* | 1 | 1 | 1 | 1 |
| MT Carbon black pbw* | 25 | 25 | 25 | 25 |
| Vulcanization: 175° C. × 10 minutes in press, then 200° C. × 24 hours in an oven. | | | | |
| Modulus at 100% Mpa (1) | 6.2 | 7.1 | 7.5 | 7.5 |
| Tensile strength Mpa (1) | 15.0 | 16.5 | 17.7 | 17.5 |
| Breaking Elongation % (1) | 190 | 185 | 191 | 195 |
| Shore A Hardness (points) (2) | 70 | 71 | 70 | 72 |
| Compression Set (3) | | | | |
| O-Rings (25.4 × 3.53 mm) 220° C. × 70 hrs | 20 | 36 | 40 | 46 |
| Disc (12.5 mm) | 18 | 26 | 29 | 33 |
| Extrusion Test (ASTM D2230-83, System B, Garvey A, (FIG. 4) | | | | |
| Surface | A | A | A | A |
| Edge | 6 | 7 | 8 | 8 |
| Test of Stability to SF oils | | | | |
| Tested Lubricant: Shell Super-3 15W40 Immersion Test: ASTM D471 at indicated temperature, for 168 hrs. | | | | |
| Tests at 150° C. | | | | |
| a. Tensile Strength Change, % (1) | −21 | −6 | −1 | −9 |
| b. Change in Breaking Elongation, % (1) | −12 | −14 | −7 | −8 |
| c. Change in Hardness, Shore points (2) | −1 | −2 | +1 | +1 |
| Test at 170° C. | | | | |
| a. Tensile Strength Change, % (1) | −33 | −7 | −5 | −13 |
| b. Change in Breaking Elongation, % (1) | −37 | −10 | −4 | −16 |
| c. Change in Hardness, Shore points (2) | −2 | −2 | −2 | −3 |
| Tests at 200° C. | | | | |
| a. Tensile Strength Change, % (1) | −56 | −9 | −7 | −21 |
| b. Change in Breaking Elongation, % (1) | −39 | −5 | −5 | −18 |
| c. Change in Hardness, Shore points (2) | −2 | −2 | −2 | −3 |

*pbw = parts by weight
(1) According to ASTM D412 - Die C
(2) According to ASTM D2240
(3) According to ASTM D395 Method B

EXAMPLES 5 AND 6

Two compositions of fluoroelastomers were prepared with the same procedures as in the foregoing Examples. Test 6 is a comparative test. After vulcanization in a press at 170° C. for 10 minutes and in an oven at 250° C. for 24 hours, two samples were treated with steam at 160° C. for 7 days.

The physical properties of the two products are reported in Table 2.

TABLE 2

| Test | 5 | 6 |
|---|---|---|
| TECNOFLON NM | 70 | 100 |
| AFLAS 150 | 30 | — |
| BDDPCl | 0.40 | 0.45 |
| MT Carbon Black | 30 | 30 |
| LUPERCO 101 XL | 1.5 | — |
| TAIC | 1.5 | — |
| Carnauba Wax | 1 | 1 |
| BISPHENOL AF | 1.35 | 1.8 |
| PbO | 5 | 5 |
| Calcium hydroxide | 3 | 3 |
| Vulcanization: 170° C. × 10 minutes in press, then 250° C. × 24 hours in oven. | | |
| Physical Properties | | |
| a. Tensile Strength MPa | 14.0 | 13.0 |
| b. Elongation % | 180 | 175 |
| c. Hardness Shore A | 75 | 76 |
| After treatment with water + ethylene glycol (50/50 by weight) at 160° C. for 21 days | | |
| a. Tensile Strength MPa | 12.0 | 11.5 |
| b. Elongation % | 230 | 170 |
| c. Hardness Shore A | 70 | 68 |
| d. Volume change % | +3 | +12 |
| After treatment in water + NALCOL ® 2000 (Tradename of Nalco Co.) in 128/1 by vol. ratio for 21 days at 162° C. | | |
| a. Volume change % | +12 | +27 |

What is claimed is:

1. Co-vulcanizable compositions of fluoroelastomers comprising:
   (A) 55-85% by weight of a fluoroelastomer constituted by 40-85 mol % of vinylidene fluoride, 15-35 mol % of perfluoropropene, and 0-30 mol % of tetrafluoroethylene;
   (B) 15-45% by weight of a copolymer constituted by 40-60 mol % of tetrafluoroethylene and 60-40 mol % of propylene;
   (C) 0.7-2.5 parts, per 100 parts of (A)+(B) blend, of a dihydroxy aromatic compound;
   (D) 0.3-1.5 part, per 100 parts of (A)+(B) blend, of a quaternary ammonium, phosphonium or aminophosphonium compound;
   (E) 0.4-5 parts, per 100 parts of (A)+(B) blend, of an organic peroxide;
   (F) 1-5% by weight, per 100 parts of (A)+(B) blend, of a peroxidic cross-linking coagent.

2. Co-vulcanizable compositions of fluoroelastomers according to claim 1, wherein the dihydroxy aromatic compound is selected from the group consisting of di-, tri-, and tetrahydroxybenzene, di-, tri- and tetrahydroxy-naphthalene, di-, tri- and tetra-hydroxyanthracene, and bisphenols of the formula

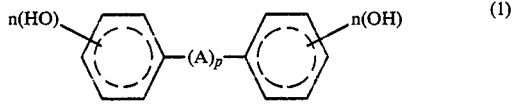

wherein A is a difunctional aliphatic, cycloaliphatic or aromatic radical having a number of carbon atoms within the range of from 1 to 13, or a thio, oxy, carbonyl, sulphinyl or sulphonyl radical, p may be either 0 or 1; and n may be either 1 or 2.

3. Co-vulcanizable compositions of fluoroelastomers according to claim 1 or 2, wherein the quaternary ammonium compound is selected from the group consisting of those having the formulae (2), (3), and (4):

$$[NR_1R_2R_3R_4]_q{}^+ X^{(-)}{}_q \qquad (2)$$

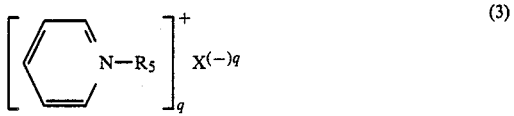

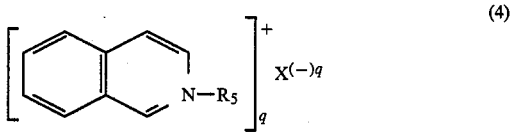

wherein $R_1$, $R_2$, $R_3$ and $R_4$, equal to or different from each other, are selected from the group consisting of alkyl, fluoroalkyl, aralkyl, polyoxyalkenyl and polyoxyfluoroalkenyl groups with a number of carbon atoms within the range of from 1 to 20, with the proviso that at least two of $R_1$, $R_2$, $R_3$ and $R_4$, are an alkyl or aralkyl group; $R_5$ is an alkyl group with a number of carbon atoms within the range of from 1 to 20; X is selected from the group consisting of a hydroxide, a halide, a sulphate, a sulphite; a carbonate, a pentachlorothiophenolate, a tetrafluoroborate, a hexafluorosilicate, a hexafluorophosphate, a dimethyl phosphate, a carboxylate and a dicarboxylate of an alkyl or aralkyl or aryl group having from 1 to 20 carbon atoms; and q is either 1 or 2 and represents the valence of X.

4. Co-vulcanizable compositions of fluoroelastomers according to claim 1 or 2, wherein the quaternary compound is selected from those having formula $$[PR_6R_7R_8R_9]_r{}^+ Z^{-(r)} \qquad (5)$$

wherein P is phosphorus, arsenic or antimony, and wherein $R_6$, $R_7$, $R_8$ amd $R_9$ is selected from the group consisting of an alkyl, aryl, aralkyl, alkenyl group, with a number of carbon atoms within the range of from 1 to 20, Z is selected from the group consisting of a halide, a sulphate, a sulphite, a carbonate, a pentachlorothiophenolate, a tetrafluoroborate, a hexafluorosilicate, a hexafluorophosphate, a dimethyl phosphate, a carboxylate and a dicarboxylate of an alkyl or aralkyl group or of an alkenyl group having a number of carbon atoms within the range of from 1 to 20; r is either 1 or 2 and represents the valence of Z.

5. Co-vulcanizable compositions of fluoroelastomers according to claim 1 or 2, wherein the quaternary aminophosphonium compound is selected from the group consisting of those of formula $$[P(NR'R'')_s R'''_{4-s}]_m{}^+ Y^{m-} \qquad (6)$$

wherein R', R" and R''', equal to or different from each other, are selected from the group consisting of alkyl, cycloalkyl, aryl, aralkyl, oxyalkyl or polyoxyalkyl radicals with a free or etherified end hydroxy group, containing from 1 to 18 carbon atoms, and wherein
R' and R" may be linked to each other by a nitrogen atom, to form a heterocyclic ring;
s is an integer between 1 and 4,
m is an integer from 1 to 3 equal to the valence of ion Y, and
Y is either an organic or inorganic anion having valence m.

6. Co-vulcanizable compositions of fluoroelastomers according to claim 1 or 2, wherein the organic peroxide is 2,5-dimethyl-2,5-di-tert.butylperoxyhexane or the corresponding derivative of hexine.

7. Co-vulcanizable compositions of fluoroelastomers according to claim 1 or 2, wherein the peroxidic crosslinking co-agent is triallylisocyanurate.

8. Co-vulcanizable compositions of fluoroelastomers according to claim 1, wherein the dihydroxy aromatic compound is selected from the group consisting of di-, tri-, and tetra-hydroxybenzene, di-, tri- and tetrahydroxy-naphthalene, di-, tri- and tetra-hydroxyanthracene, and bisphenols of the formula

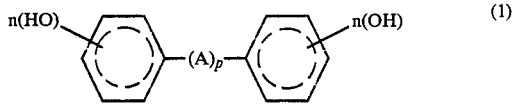

wherein A is a difunctional aliphatic, cycloaliphatic or aromatic radical hving a number of carbon atoms within the range of from 1 to 13, or a thio, oxy, carbonyl, sulphinyl or sulphonyl radical, and wherein a is substituted with at least one chlorine or fluorine atom; p is either 0 or 1; n is either 1 or 2, and any aromatic ring of a polyhydroxy compound is substituted with at least a chlorine fluorine, bromine atom, with a —CHO group, or with a carboxylic or carbonyl radical of general formula —COR, with R being equal to —OH or to an alkyl, aryl or cycloalkyl radical with a number of carbon atoms within the range of from 1 to 8.

9. Co-vulcanizable composition of fluoroelastomers according to claim 1 or 2, wherein the quaternary compound is selected for those having the formula $$[PR_6R_7R_8R_9]_r{}^+ Z^{-(r)} \qquad (5)$$

wherein P is phosphorus, arsenic or antimony, and wherein $R_6$, $R_7$, $R_8$ and $R_9$ may be selected from the group consisting of an alkyl, aryl, aralkyl, alkenyl group, with a number of carbon atoms within the range of from 1 to 20, and substituted with chlorine, fluorine, bromine, cyano, —$OR_{10}$ and —$COOR_{10}$ or similar substituents wherein $R_{10}$ may be an alkyl, aryl, arylalkyl or alkenyl group with a number of carbon atoms within the range of from 1 to 20; Z is selected from the group consisting of a halide, a sulphate, a sulphite, a carbonate, a pentachlorothiophenolate, a tetrafluoroborate, a hexafluorosilicate, a hexfluorophosphate, a dimethyl phosphate, a carboxylate and a dicarboxylate of an alkyl or aralkyl group or of an alkenyl group having a number of carbon atoms within the range of from 1 to 20; and r is either 1 or 2 and represents the valence of Z.

10. Co-vulcanizable compositions of fluoroelastomers according to claim 1 or 2, wherein the quaternary aminophosphoniun compound is selected from the group consisting of those of formula $$[P(NR'R'')_s R'''_{4-s}]_m^+ Y^{m-} \qquad (6)$$

wherein R', R" and R''', equal to or different from each other, are selected from the group consisting of alkyl, cycloalkyl, aryl, aralkyl, oxyalkyl or polyoxyalkyl radicals with a free or etherified end hydroxy group, containing from 1 to 18 carbon atoms and containing, as substituents, halogens, cyanides, hydroxy groups or carbalkoxy groups, and wherein R' and R" may be linked to each other by a nitrogen atom, to form a heterocyclic ring;

s is n integer between 1 and 4;

m is an integer from 1 to 3 equal to the valence of ion Y, and

Y is either an organic or inorganic anion having valence m.

11. Co-vulcanizable compositions of fluoroelastomers according to claim 10, wherein the organic peroxide is 2,5-dimethyl-2,5-di-tert.butylperoxyhexane or the corresponding derivative of hexine.

12. Co-vulcanizable compositions of fluoroelastomers according to claim 10, wherein the peroxidic cross-linking coagent is triallylisocyanurate.

* * * * *

UNITED STATES PATENT AND TRADEMARK OFFICE
CERTIFICATE OF CORRECTION

PATENT NO. : 4,831,083

DATED : May 16, 1989

INVENTOR(S) : Geri, et al

It is certified that error appears in the above-identified patent and that said Letters Patent is hereby corrected as shown below:

On the title page:

RELATED U.S. APPLICATION DATA

--[62] This application is a Continuation-In-Part of Application Serial No. 875,443 filed 6/17/86 now abandoned--.

Signed and Sealed this

Third Day of July, 1990

Attest:

Attesting Officer

HARRY F. MANBECK, JR.

Commissioner of Patents and Trademarks